United States Patent [19] [11] 3,954,999
Vidal et al. [45] May 4, 1976

[54] DOUGH-IMPROVER COMPOSITION

[75] Inventors: Frederick D. Vidal, Englewood Cliffs; Albert B. Gerrity, Hazlet, both of N.J.; Walter Clavan, Jenkintown, Pa.

[73] Assignee: Pennwalt Corporation, Philadelphia, Pa.

[22] Filed: May 17, 1974

[21] Appl. No.: 470,767

[52] U.S. Cl. .................................. 426/61; 426/653
[51] Int. Cl.² .......................................... A21D 2/08
[58] Field of Search ................ 426/20, 22, 23, 36, 426/26, 89, 147, 152, 226, 61, 94, 653

[56] References Cited
UNITED STATES PATENTS

| | | | |
|---|---|---|---|
| 2,903,361 | 9/1959 | Marks et al. | 426/26 |
| 3,578,462 | 5/1971 | Smerak et al. | 426/226 X |
| 3,595,671 | 7/1971 | Cooke et al. | 426/23 |

*Primary Examiner*—A. Louis Monacell
*Assistant Examiner*—R. A. Yoncoskie

[57] ABSTRACT

A composition for improvement of dough comprising a powdery mixture of strong oxidizing agent, an organic flour and dough additive and an inert, hydrated salt.

12 Claims, No Drawings

DOUGH-IMPROVER COMPOSITION

This invention relates to a composition in pulverulent form containing a strong oxidizing agent useful as a flour additive for improving the handling properties of dough and the quality of bread and other bakery products prepared therefrom. More particularly, this invention concerns a powdery mixture comprised of a strong oxidizing agent (a flour and dough improver), a conventional flour and dough additive of an organic chemical nature, and a hydrated salt which is inert with regard to the other aforesaid ingredients and is edibly acceptable as a filler for flour additive compositions.

It has been noted in the flour additives art that compositions comprised of concentrated powdery or granular mixtures of a strong oxidizing agent with an organic material additive may present some hazard when contacted with a flame or intense heat. This invention provides a safer mixture comprised of said ingredients with regard to reduction of any fire and/or explosive decomposition potential. The composition of this invention is a powdery mixture comprised of the strong oxidizing agent, the organic additive, and an edibly acceptable, inert hydrated salt. Advantageously, the inclusion of the salt in the composition embodied herein does not diminish the efficacy of the active ingredients in carrying out their improving and maturing functions in the flour and resultant dough. Further details of the invention are presented hereinbelow.

Materials illustrative of the strong oxidizing agent portion of the pulverulent mixture of the invention include the alkali metal and alkaline earth metal bromates, chlorites, periodates, iodates, and peroxides, for example, potassium bromate, potassium iodate, sodium bromate, sodium iodate, calcium bromate, calcium iodate, magnesium bromate, magnesium iodate, sodium peroxide, calcium peroxide, sodium chlorite, potassium periodate, and the like. The most widely-used oxidizing agents for flour and dough are potassium bromate, potassium iodate, calcium iodate and calcium peroxide.

The organic constituent of the composition embodied herein is composed of at least on organic material used in flour and dough treatment. For example, a widely-used organic substance for flour addition is a flour maturing agent in particulate form, fully described in U.S. Pat. No. 2,903,361, selected from the class of amides, amidines and mixed ester-amides of azodicarbonic acid, which compounds may be represented by the structural formula

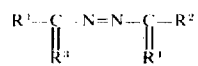

where in the case of amides, $R^3$ and $R^1$ are each an oxygen atom, and $R^1$ and $R^2$ are each $NH_2$ groups, either substituted or unsubstituted; in the case of amidines, $R^1$ and $R^2$ are as above and $R^3$ and $R^1$ are each an NH radical; in the case of the mixed ester-amides, $R^3$ and $R^1$ are each oxygen, $R^1$ is $NH_2$, substituted or unsubstituted, and $R^2$ is alkoxy. The preferred flour maturing agent from this class is azodicarbonamide.

Other organic flour additives include gluthathione and L-cysteine, either in the form of the HCl hydrate or cysteine-N-carbamide, which serve as dough conditioning aids to reduce flour mixing requirements; enzymes such as protease, amylase and lipoxidase; ascorbic acid which serves as a dough conditioning agent or flour maturing agent; and organic peroxides, for example, acetone peroxide and benzoyl peroxide, which serve as maturing and bleaching agents.

A unique additive of the combination of ingredients comprising the mixtures of the invention is an inert, hydrated salt, that is, inert with respect to the active flour and dough treating ingredients and which is, of course, edibly acceptable in food products, (i.e., in the minor proportions as will be added to flour and dough in utilizing the present compositions) and provides to the claimed powdery mixture, when incorporated therein in the proportions as set forth below, a Trauzl number (as defined in the Modified Trauzl Block Test for hazard evaluation described below) of less than 40. Such hydrated salts include the edibly acceptable hydrated alkali metal and hydrated alkaline earth metal salts of inorganic or organic acids. Suitable hydrated salts are $CaHPO_4.2H_2O$; $MgSO_4.7H_2O$; $Na_2HPO_4.12H_2O$; $Ca(H_2PO_4)_2.H_2O$; $Na_2HPO_4.7H_2O$; KNa tartrate.$4H_2O$; sodium citrate.$2H_2O$; calcium citrate.$4H_2O$; calcium lactate.$5H_2O$; $Na_2CO_3.10H_2O$; $Na_2SO_4.10H_2O$; $MgCl_2.6H_2O$; $FeCl_3.6H_2O$; $CuSO_4.5H_2O$ and the like. Most of the foregoing hydrated salts provide free-flowing, non-agglomerating powder mixtures for dough improvement which can be metered in small quntities by dry chemical feeders without arching or uneven flow patterns over extended periods of time. The preferred salts are $CaHPO_4.2H_2O$ and $Ca(H_2PO_4)_2.H_2O$. However, others from this illustrative group are less preferred because the powdery mixtures containing same must be added to the dough process manually as they make the powdery mixture excessively damp causing caking or agglomeration and loss of the free-flowing characteristics essential to continuous mechanical feeding. Salts representative of this type are $Na_2CO_3.10H_2O$ and $Na_2SO_4.10H_2O$. In addition, some salts, for example, $MgCl_2.6H_2O$, are less preferred because they are very hygroscopic, and if the powdery mixture containing same is inadvertently left exposed to a humid atmosphere, liquid lakes will be formed. Although certain other hydrated salts, such as $Al_2(SO_4)_3.9H_2O$ and $Al_2(SO_4)_3.18H_2O$ provide free-flowing mixtures, the hazard evaluation test results (Trauzl Block Test and Flame test, described hereinbelow) for the oxidizing agent-containing mixtures are unexpectedly poor. Many available hydrated salts are edibly unacceptable for the present compositions, for example, barium citrate.$7H_2O$, sodium tetraborate.$10H_2O$, sodium metasilicate.$9H_2O$, and it is apparent that most of the hydrated salts disclosed in U.S. Pat. No. 3,793,216 for making a calcium hypochlorite sanitizing composition flame resistant (a much different system than involved in the present invention) are unsuitable for the present compositions.

The proportions of the aforesaid constituents in the substantially homogenous, pulverulent mixture of the invention will range as follows: generally from about 10 to about 100 parts by weight of the organic flour additive constituent per 100 parts by weight of the oxidizing agent constituent, and an amount of hydrated salt sufficient to provide a moisture content of at least about 15 parts by weight of $H_2O$, preferably from about 15 to about 50 parts $H_2O$, and more preferably from about 20 to 40 parts $H_2O$, per 100 parts by weight of the oxidizing agent. The compositions may have included therein, in addition, non-hydrated inert fillers, generally up to about 1 to 5 parts of filler per 100 parts by weight of oxidizing agent. Representative of such fillers are tricalcium phosphate, sodium chloride, magnesium carbonate, silicon dioxide and microcrystalline cellulose. It is understood, however, that the upper limit of filler, as well as the upper limit of hydrated salt, is one of practicality due to he extra bulk such materials provide to the mixtures. The usual form in which the mixtures of the invention are supplied to the baking industry is as individual packages or envelopes of powder designed to be added to the yeast broth or dough and of such amount of provide from about 5 to about 100 ppm of oxidizing agent per 100 pounds of flour. The mixtures can, of course, be shipped in bulk quantities to the mill or bakery where the compositions can be apportioned for use in the desired amount.

Another embodiment of this invention comprises a powdery mixture of the strong oxidizing agent with the described inert, hydrated salt in the proportions as above disclosed. This mixture is adapted for shipment to the mill or bakery where it is subsequently mixed with the organic flour and dough additive(s), whereby the hydrated salt provides a greater margin of safety for the overall mixture of ingredients.

Several standard tests which have been developed to gauge the fire hazards and explosive (decomposition) tendencies of substances are useful in evaluating the compositions of this invention. The first of these is the Modified Trauzl Block Test which measures the sensitivity of the test sample to a blasting cap shock and the potential energy released under these conditions. Quantitative measurement is made by measuring the degree of expansion of a lead block into which 6 grams of substance in a sample vial is placed in contact with a No. 8 electric blasting cap. The volume of the lead block is measured before and after detonation to the nearest half milliliter using water as a reference medium. The increase in the volume of the block is reported as the "Trauzl number". The minimum expansion is the result obtained using water as the test material, which gives an expansion of 7.0 ml., or a Trauzl number of 7. The maximum expansion which can be sustained by the lead block, before rupturing, is 115 ml. or a Trauzl number of 115. For the kind of compositions involved herein, Trauzl numbers of less than 40 are regarded as designating safe materials.

Another test for gauging safety of the tablets is the "Impact Sensitivity" test in which the test apparatus, a DuPont Impact testing machine, is set at a desired height. A 30 milligram sample is placed in the center of the drop test cup. The cup is placed on the anvil, under the plunger pin assembly and the weight dropped. This operation is repeated at several different heights. A report and/or smoke and obvious decomposition of the sample is considered a positive result. If none of these properties is observed, the result is considered negative.

Yet another test for evaluating safety of the compositions is the flame test in which the flame of a Bunsen burner is held to the sample for five seconds, then withdrawn, and observations noted. A hazard evaluation rating system has been devised in accordance with this test. Using a numbering system of 1 through 10, the best flame rating (most resistant to decomposition and ignition) is assigned the number 1; the poorest rating (least resistant to decomposition and ignition) is assigned the number 10.

Some of the following examples are illustrative of the compositions of the invention. Their safer properties are shown by comparison with the compositions containing only an anhydrous filler or inadequate proportions of hydrated salt. Amounts of ingredients are in weight percents.

EXAMPLE 1

| | |
|---|---|
| Potassium bromate (95%) | 56.7% |
| Azodicarbonamide | 27.5% |
| Dicalcium phosphate, Anhydrous | 14.8% |
| Microcrystalline Cellulose ("Avicel") | 1.0% |

Trauzl No. — 115;
Flame test — Violent decomposition — ignition — smoke propagation to complete decomposition — Rating — 10;
Impact Sensitivity — Positive — report at 18 inches;
Flow properties — Excellent.

EXAMPLE 2

| | |
|---|---|
| Potassium bromate (95%) | 40% |
| Azodicarbonamide | 20% |
| Salt (NaCl) | 40% |

Trauzl No. — 50;
Flame test — Vigorous decomposition — propagation to complete decomposition — Rating — 8;
Impact Sensitivity — Positive at 35 inches;
Flow Properties — Good.

EXAMPLE 3

| | |
|---|---|
| Potassium bromate (95%) | 50 % |
| Azodicarbonamide | 24 % |
| Dicalcium phosphate.2H$_2$O | 8.5% |
| Aluminum sulfate.18H$_2$O | 16.5% |
| Microcrystalline Cellulose ("Avicel") | 1.0% |

Trauzl No. — 65;
Flame test — Vigorous decomposition — propagation to complete decomposition — Rating — 6;
Impact Sensitivity — Negative at 20 inches;
Flow Properties — Good.

EXAMPLE 4

| | |
|---|---|
| Potassium bromate (95%) | 40% |
| Azodicarbonamide | 20% |
| Sodium Chloride | 19% |
| Calcium lactate.5H$_2$O | 19% |
| Silicon dioxide ("Cabosil") | 2% |

Flame test — Vigorous decomposition — propagation to complete decomposition; smoke — Rating — 7;
Flow Properties - Good.

EXAMPLE 5

| | Sample a | Sample b |
|---|---|---|
| Potassium bromate (95%) | 41 % | 41% |
| Azodicarbonamide | 20 % | 20% |
| Dicalcium phosphate.2H$_2$O | 14.5% | 15% |
| Calcium lactate 5H$_2$O | 23.5% | 24% |
| Microcrystalline Cellulose ("Avicel") | 1.0% | |

| Potassium bromate (95%) | 41% |
| Azodicarbonamide | 20% |
| Dicalcium phosphate.2H₂O | 14.5% |
| Magnesium chloride.6H₂O | 23.5% |
| Mycrocrystalline Cellulose | 1.0% |

Trauzl No. — 26.5;
Flame test — Mild decomposition — some propagation — Rating - 3.5;
Impact Sensitivity — Negative at 35 inches;
Flow Properties — Fair but tendency for stickiness due to formation of liquid lakes.

EXAMPLE 7

| Potassium bromate (95%) | 41% |
| Azodicarbonamide | 20% |
| Dicalcium phosphate.2H₂O | 23.5% |
| Aluminum sulfate.18H₂O | 14.5% |
| Microcrystalline cellulose | 1.0% |

Trauzl No. — 39.5;
Flame test — Mild decomposition — slight propagation (5 seconds) — Rating — 2.5;
Impact Sensitivity — Negative at 20 inches;
Flow Properties — Good.

EXAMPLE 8

| Potassium bromate (95%) | 40% |
| Azodicarbonamide | 20% |
| Dicalcium phosphate.2H₂O (unmilled) | 37% |
| Silicon dioxide ("Cabosil") | 3% |

Trauzl No. — 20;
Flame test — Moderate decomposition — no propagation — no ignition — slight smoke — Rating — 2;
Impact Sensitivity — Negative at 35 inches;
Flow Properties — Excellent.

EXAMPLE 9

| Potassium bromate (95%) | 40% |
| Azodicarbonamide | 20% |
| Magnesium chloride.6H₂O | 38% |
| Silicon dioxide | 2% |

Trauzl No. — 31;
Flame test — Slow decomposition — no propagation — Rating — 1.5;
Impact Sensitivity — Negative at 35 inches;
Flow Properties — Poor — blend slightly sticky.

We Claim:

1. A composition for improving flour and dough comprising a powdery mixture of strong oxidizing agent, organic flour and dough additive, and an inert, edibly acceptable, hydrated salt wherein the proportion of said hydrated salt in the mixture provides about 15 parts up to about 50 parts by weight of water per 100 parts by weight of the strong oxidizing agent and a Trauzl number for the mixture of less than 40.

2. A composition according to claim 1 in which the strong oxidizing agent is an alkali metal or alkaline earth metal bromate, iodate, chlorite, periodate or peroxide; and the organic chemical flour and dough additive is selected from the group consisting of amides, amidines and mixed ester-amides of azodicarbonic acid, gluthathione, L-cysteine. HCl hydrate, cysteine-N-carbamide, ascorbic acid, organic peroxide, and enzymes.

3. A composition according to claim 2 in which the oxidizing agent is selected from the group consisting of potassium bromate, potassium iodate, sodium bromate, sodium iodate, calcium bromate, calcium iodate, magnesium bromate, magnesium iodate, sodium peroxide, calcium peroxide, sodium chlorite and potassium periodate.

4. A composition according to claim 2 in which the organic flour and dough additive is azodicarbonamide.

5. A composition according to claim 3 in which the hydrated salt is selected from the group consisting of CaHPO₄.2H₂O; MgSO₄.7H₂O; Na₂HPO₄.12H₂O; Ca(H₂PO₄)₂.H₂O; Na₂HPO₄.7H₂O; KNa tartrate.4H₂O; sodium citrate.2H₂O; calcium citrate.4H₂O; calcium lactate.5H₂O; Na₂CO₃.10H₂O; Na₂SO₄.10H₂O; MgCl₂.6H₂O; FeCl₃.6H₂O; and CuSO₄.5H₂O.

6. A composition according to claim 5 in which the organic flour and dough additive is azodicarbonamide.

7. A composition according to claim 6 in which the strong oxidizing agent is selected from the group consisting of potassium bromate, potassium iodate, calcium iodate and calcium peroxide.

8. A composition for improving flour and dough comprising a powdery mixture of strong oxidizing agent and an inert, edibly acceptable hydrated salt wherein the proportion of said hydrated salt in the mixture provides about 15 parts up to about 50 parts by weight of water per 100 parts by weight of the strong oxidizing agent, and a Trauzl number for the mixture of less than 40 when from about 10 to about 100 parts by weight, per 100 parts by weight of the oxidizing agent, of organic flour and dough additive is mixed therewith.

9. A composition according to claim 8 in which the strong oxidizing agent is an alkali metal or alkaline earth metal bromate, iodate, chlorite, periodate or peroxide.

10. A composition according to claim 9 in which the oxidizing agent is selected from the group consisting of potassium bromate, potassium iodate, sodium bromate, sodium iodate, calcium bromate, calcium iodate, magnesium bromate, magnesium iodate, sodium peroxide, calcium peroxide, sodium chlorite and potassium periodate.

11. A composition according to claim 10 in which the hydrated salt in selected from the group consisting of CaHPO₄.2H₂O; MgSO₄.7H₂O; Na₂HPO₄.12H₂O; Ca(H₂PO₄)₂.H₂O; Na₂HPO₄.7H₂O; KNa tartrate.4H₂O; sodium citrate.2H₂O; calcium citrate.4H₂O; calcium lactate.5H₂O; Na₂CO₃.10H₂O; Na₂SO₄.10H₂O; MgCl₂.6H₂O; FeCl₃.6H₂O; and CuSO₄.5H₂O.

12. A composition according to claim 11 in which the strong oxidizing agent is selected from the group consisting of potassium bromate, potassium iodate, calcium iodate and calcium peroxide.

* * * * *